United States Patent
Whitby-Strevens

(10) Patent No.: US 9,838,226 B2
(45) Date of Patent: Dec. 5, 2017

(54) METHODS AND APPARATUS FOR THE INTELLIGENT SCRAMBLING OF CONTROL SYMBOLS

(71) Applicant: Apple Inc., Cupertino, CA (US)

(72) Inventor: Colin Whitby-Strevens, Ben Lomond, CA (US)

(73) Assignee: Apple Inc., Cupertino, CA (US)

( * ) Notice: Subject to any disclaimer, the term of this patent is extended or adjusted under 35 U.S.C. 154(b) by 493 days.

(21) Appl. No.: 13/747,264

(22) Filed: Jan. 22, 2013

(65) Prior Publication Data

US 2013/0195218 A1    Aug. 1, 2013

Related U.S. Application Data

(60) Provisional application No. 61/591,723, filed on Jan. 27, 2012, provisional application No. 61/711,656, filed on Oct. 9, 2012.

(51) Int. Cl.
| | |
|---|---|
| *H04K 1/02* | (2006.01) |
| *H04L 25/03* | (2006.01) |
| *H04B 15/00* | (2006.01) |
| *H04L 9/00* | (2006.01) |
| *H04L 9/06* | (2006.01) |
| *H04B 1/04* | (2006.01) |
| *H03K 19/177* | (2006.01) |

(52) U.S. Cl.
CPC ..... *H04L 25/03343* (2013.01); *H04B 1/0475* (2013.01); *H04B 15/00* (2013.01); *H04L 9/003* (2013.01); *H04L 9/0656* (2013.01); *H03K 19/17728* (2013.01); *H04B 2215/061* (2013.01)

(58) Field of Classification Search
CPC ..................................................... H04L 1/0006
USPC ........................................................... 375/296
See application file for complete search history.

(56) References Cited

U.S. PATENT DOCUMENTS

| | | |
|---|---|---|
| 3,902,117 A | 8/1975 | Sheppard |
| 4,523,181 A | 6/1985 | Tazaki et al. |
| (Continued) | | |

FOREIGN PATENT DOCUMENTS

| | | |
|---|---|---|
| CN | 101573873 A | 11/2009 |
| CN | 102290024 A | 12/2011 |
| (Continued) | | |

OTHER PUBLICATIONS

Nxp: "Technical Analysis of the JEDEC JESD204A Data Converter Interface", Jun. 1, 2009 (Jun. 1, 2009), XP055070699, Retrieved from Internet: URL:http://www.nxp.com/wcm_documents/news/download-media/publications/technical_whitepaper_final.pdf [retrieved on Jul. 10, 2013] section 3.2 last but one par. p. 12 2nd par. p. 3; figure 4.

(Continued)

*Primary Examiner* — Lihong Yu
(74) *Attorney, Agent, or Firm* — Gazdzinski & Associates, PC

(57) ABSTRACT

Methods and apparatus for the scrambling of control symbols. In one embodiment, the control symbols are associated with an HDMI interface, and the methods and apparatus are configured to scramble the symbols to as to mitigate the effects of electromagnetic interference (EMI) created by the transmission of otherwise unscrambled sequences of symbols which may contain significant "clock pattern" or other undesirable artifact.

20 Claims, 8 Drawing Sheets

(56) References Cited

U.S. PATENT DOCUMENTS

| | | |
|---|---|---|
| 4,791,407 A | 12/1988 | Prucnal et al. |
| 5,224,096 A | 6/1993 | Onishi et al. |
| 5,461,426 A | 10/1995 | Limberg et al. |
| 5,961,608 A | 10/1999 | Onosaka et al. |
| 5,961,680 A | 10/1999 | Wooldridge |
| 6,078,532 A | 6/2000 | Rivers et al. |
| 6,222,891 B1 | 4/2001 | Liu et al. |
| 6,381,332 B1 | 4/2002 | Glaab |
| 6,426,780 B1 | 7/2002 | Limberg et al. |
| 6,516,437 B1 | 2/2003 | Van Stralen et al. |
| 6,574,731 B1 * | 6/2003 | Coles et al. .................. 713/168 |
| 6,597,743 B1 | 7/2003 | Khayrallah et al. |
| 6,618,395 B1 | 9/2003 | Kimmitt |
| 6,654,926 B1 | 11/2003 | Raphaeli et al. |
| 6,775,334 B1 | 8/2004 | Liu et al. |
| 6,870,930 B1 | 3/2005 | Kim et al. |
| 7,062,587 B2 | 6/2006 | Zaidi et al. |
| 7,062,687 B1 | 6/2006 | Gfeller et al. |
| 7,062,689 B2 | 6/2006 | Slobodnik |
| 7,257,163 B2 | 8/2007 | Hwang et al. |
| 7,359,437 B2 | 4/2008 | Hwang et al. |
| 7,365,575 B2 | 4/2008 | Kim |
| 7,394,406 B2 | 7/2008 | Pasqualino |
| 7,403,486 B2 | 7/2008 | Flask |
| 7,460,031 B2 | 12/2008 | Yeo et al. |
| 7,561,074 B2 | 7/2009 | Pasqualino |
| 7,573,596 B2 | 8/2009 | Owen |
| 7,639,687 B1 | 12/2009 | Tsai et al. |
| 7,672,285 B2 | 3/2010 | Sun et al. |
| 7,773,752 B2 | 8/2010 | Noh et al. |
| 7,961,880 B2 | 6/2011 | Wang et al. |
| 8,000,404 B2 | 8/2011 | Talbot et al. |
| 8,139,660 B2 | 3/2012 | Anigstein et al. |
| 8,253,605 B2 | 8/2012 | Rivoir |
| 8,325,699 B2 | 12/2012 | Sun et al. |
| 8,588,287 B2 | 11/2013 | Chen et al. |
| 8,644,504 B2 | 2/2014 | Choi |
| 8,650,010 B2 | 2/2014 | Raju M. et al. |
| 8,678,860 B2 | 3/2014 | Minich et al. |
| 8,733,650 B1 | 5/2014 | Segal et al. |
| 8,737,625 B2 | 5/2014 | Ikeda et al. |
| 8,750,176 B2 | 6/2014 | Whitby-Strevens |
| 8,838,822 B2 | 9/2014 | Spalla et al. |
| 8,917,194 B2 | 12/2014 | Whitby-Strevens |
| 8,949,493 B1 | 2/2015 | Wortman et al. |
| 9,166,623 B1 | 10/2015 | Bates et al. |
| 9,210,010 B2 | 12/2015 | Whitby-Strevens |
| 9,484,954 B1 | 11/2016 | Gopal et al. |
| 2001/0022813 A1 | 9/2001 | Tan et al. |
| 2002/0051562 A1 | 5/2002 | Sheppard et al. |
| 2002/0138721 A1 | 9/2002 | Kwon et al. |
| 2002/0159553 A1 | 10/2002 | McCarty et al. |
| 2003/0005436 A1 | 1/2003 | Naganuma |
| 2003/0043141 A1 | 3/2003 | Bae et al. |
| 2003/0048851 A1 | 3/2003 | Hwang et al. |
| 2003/0048852 A1 | 3/2003 | Hwang et al. |
| 2003/0165182 A1 | 9/2003 | O'Farrell |
| 2003/0168512 A1 | 9/2003 | Longacre et al. |
| 2003/0214507 A1 | 11/2003 | Mawatari et al. |
| 2004/0002312 A1 | 1/2004 | Li et al. |
| 2004/0071158 A1 | 4/2004 | Wei |
| 2004/0071221 A1 | 4/2004 | Nakada et al. |
| 2004/0088633 A1 | 5/2004 | Lida et al. |
| 2004/0103363 A1 | 5/2004 | Kim et al. |
| 2004/0131025 A1 | 7/2004 | Dohler et al. |
| 2005/0012592 A1 | 1/2005 | Debelleix |
| 2005/0175122 A1 | 8/2005 | Nefedov et al. |
| 2005/0185796 A1 * | 8/2005 | Lablans ....................... 380/268 |
| 2005/0286643 A1 | 12/2005 | Ozawa et al. |
| 2006/0062467 A1 | 3/2006 | Zou et al. |
| 2006/0095613 A1 | 5/2006 | Venkata et al. |
| 2006/0117125 A1 | 6/2006 | Tseng |
| 2006/0176941 A1 | 8/2006 | Nieto et al. |
| 2006/0176983 A1 | 8/2006 | Wadsworth et al. |
| 2006/0203900 A1 | 9/2006 | Koralek et al. |
| 2006/0250628 A1 | 11/2006 | Owen |
| 2007/0016778 A1 | 1/2007 | Lyle |
| 2007/0016779 A1 | 1/2007 | Lyle |
| 2007/0074242 A1 | 3/2007 | Wang et al. |
| 2007/0107034 A1 | 5/2007 | Gotwals |
| 2007/0116055 A1 | 5/2007 | Atsumi et al. |
| 2007/0139232 A1 | 6/2007 | Venkata et al. |
| 2007/0153930 A1 | 7/2007 | Reid |
| 2007/0192664 A1 | 8/2007 | Ogawa |
| 2007/0204204 A1 | 8/2007 | Sul et al. |
| 2007/0206638 A1 | 9/2007 | Santoru et al. |
| 2007/0206642 A1 | 9/2007 | Egan et al. |
| 2007/0220279 A1 | 9/2007 | Northcutt et al. |
| 2007/0230687 A1 | 10/2007 | Talbot |
| 2007/0237332 A1 | 10/2007 | Lyle |
| 2007/0242764 A1 | 10/2007 | Anigstein et al. |
| 2007/0257923 A1 | 11/2007 | Whitby-Strevens |
| 2008/0024334 A1 | 1/2008 | Grivna |
| 2008/0046728 A1 | 2/2008 | Lyle |
| 2008/0095218 A1 | 4/2008 | Murray et al. |
| 2008/0123764 A1 | 5/2008 | McNamara et al. |
| 2008/0178062 A1 | 7/2008 | Norris et al. |
| 2008/0178063 A1 | 7/2008 | Norris et al. |
| 2008/0180287 A1 | 7/2008 | Widmer |
| 2008/0186545 A1 | 8/2008 | Meier et al. |
| 2008/0204285 A1 | 8/2008 | Carter et al. |
| 2008/0215934 A1 | 9/2008 | Liu |
| 2008/0235551 A1 | 9/2008 | Lin |
| 2008/0252497 A1 | 10/2008 | Widmer |
| 2008/0258945 A1 | 10/2008 | Widmer |
| 2008/0263621 A1 | 10/2008 | Austerlitz et al. |
| 2008/0273602 A1 | 11/2008 | Glen |
| 2008/0304596 A1 * | 12/2008 | Tan et al. ..................... 375/321 |
| 2009/0010318 A1 | 1/2009 | Belogolovyi et al. |
| 2009/0024756 A1 | 1/2009 | Spalla et al. |
| 2009/0100179 A1 | 4/2009 | Song et al. |
| 2009/0147864 A1 | 6/2009 | Lida et al. |
| 2009/0185565 A1 | 7/2009 | Diab et al. |
| 2009/0195506 A1 | 8/2009 | Geidl et al. |
| 2010/0057556 A1 | 3/2010 | Rousso et al. |
| 2010/0067693 A1 | 3/2010 | Courington et al. |
| 2010/0074350 A1 | 3/2010 | Malladi et al. |
| 2010/0111100 A1 | 5/2010 | Baumer |
| 2010/0118795 A1 | 5/2010 | Hassan |
| 2010/0128816 A1 | 5/2010 | Sun et al. |
| 2010/0238951 A1 | 9/2010 | Ozawa |
| 2010/0262893 A1 | 10/2010 | Carter et al. |
| 2010/0322340 A1 * | 12/2010 | Bohm .......................... 375/295 |
| 2011/0026414 A1 | 2/2011 | Banerjee |
| 2011/0122142 A1 | 5/2011 | Wyatt et al. |
| 2011/0145676 A1 | 6/2011 | Nicholson |
| 2011/0188613 A1 | 8/2011 | Dowling et al. |
| 2011/0208954 A1 * | 8/2011 | Barrett et al. ................... 713/2 |
| 2011/0246840 A1 | 10/2011 | Khoshnevis et al. |
| 2011/0310296 A1 * | 12/2011 | Lee et al. ..................... 348/539 |
| 2011/0320905 A1 | 12/2011 | Lin et al. |
| 2012/0084559 A1 | 4/2012 | Bonicatto |
| 2012/0139593 A1 | 6/2012 | Saito |
| 2012/0146989 A1 | 6/2012 | Whitby-Strevens |
| 2012/0147274 A1 | 6/2012 | Hassan et al. |
| 2012/0163490 A1 | 6/2012 | Whitby-Strevens |
| 2012/0188951 A1 | 7/2012 | He et al. |
| 2012/0195357 A1 | 8/2012 | Chen et al. |
| 2013/0195160 A1 | 8/2013 | Whitby-Strevens |
| 2013/0195218 A1 | 8/2013 | Whitby-Strevens |
| 2014/0321575 A1 | 10/2014 | Asakura et al. |
| 2014/0344650 A1 | 11/2014 | Au |
| 2015/0156186 A1 | 6/2015 | Jeffrey |
| 2015/0188576 A1 | 7/2015 | Lim et al. |
| 2015/0215312 A1 | 7/2015 | Cesnik |
| 2015/0244394 A1 | 8/2015 | Wang et al. |
| 2015/0256522 A1 | 9/2015 | Jeffrey |
| 2016/0127053 A1 | 5/2016 | Ganter |

FOREIGN PATENT DOCUMENTS

| | | |
|---|---|---|
| EP | 1517295 | 3/2005 |
| EP | 1940034 A1 | 7/2008 |
| EP | 2490473 | 8/2012 |

(56) References Cited

FOREIGN PATENT DOCUMENTS

| EP | 2807780 A2 | 12/2014 |
|---|---|---|
| KR | 20070092676 A | 9/2007 |
| WO | 03/058826 | 7/2003 |
| WO | 2011044793 | 4/2011 |
| WO | 2012/087973 | 6/2012 |
| WO | 2012087973 | 6/2012 |
| WO | 2013/112930 | 8/2013 |
| WO | WO-2013112926 A2 | 8/2013 |

OTHER PUBLICATIONS

Widmer, A. X., Franaszek, P.A., "A DC/Balanced, Partitioned/Block, 8B/10B Transmission Code", IBM J. Res. Develop, vol. 27, No. 5, Sep. 1983, pp. 440/451.
IEEE Standard for High/Performance Serial Bus, IEEE Compute Society, Oct. 21, 2008.
Video Electronics Standards Association: "Displayport Standard Version 1.1", Mar. 19, 2007, pp. 1-228.
Stein, Digital Signal Processing, a Computer Science Perspective, 2000, John Wiley & Sons Inc., pp. 712-713.
"HDMI Specification"—Version 1.4b, dated Oct. 11, 2011.
Display Port Standard Version 1.1 (Mar. 19, 2007) (VESA, www.vesa.org).
Ajanovic, J. "PCI Express 3.0 Overview", HotChips—Aug. 23, 2009, pp. 1-61.
Lindh L., et al., "Block Codes in Forward Error Correction," IEEE Draft; HA14NOK1A, IEEE-SA, Piscataway, NJ USA, vol. 802.11, Sep. 12, 2002 (Sep. 12, 2002), pp. 1-16, XP017699860, [retrieved on Sep. 12, 2002].
Video Electronics Standards Association: "Display port Standard Version 1.1 ", Mar. 19, 2007, pp. 1-228.

\* cited by examiner

METHODS AND APPARATUS FOR THE INTELLIGENT SCRAMBLING OF CONTROL SYMBOLS

PRIORITY AND RELATED APPLICATIONS

This application claims priority to U.S. Provisional Patent Application Nos. 61/591,723 filed Jan. 27, 2012 and entitled "METHODS AND APPARATUS FOR THE INTELLIGENT SCRAMBLING OF CONTROL SYMBOLS", and 61/711,656 filed Oct. 9, 2012 and entitled "METHODS AND APPARATUS FOR THE INTELLIGENT SCRAMBLING OF CONTROL SYMBOLS", each of the foregoing being incorporated herein by reference in their entirety.

This application is also related to U.S. patent application Ser. No. 13/747,383, filed Jan. 22, 2013, and entitled "METHODS AND APPARATUS FOR ERROR RATE ESTIMATION", (now issued as U.S. Pat. No. 8,897,398), which claims priority to U.S. Provisional Patent Application Ser. No. 61/591,735 filed Jan. 27, 2012 and entitled "METHODS AND APPARATUS FOR ERROR RATE ESTIMATION", and U.S. patent application Ser. No. 12/976,274 filed Dec. 22, 2010 and entitled "METHODS AND APPARATUS FOR THE INTELLIGENT ASSOCIATION OF CONTROL SYMBOLS", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of data networking and telecommunications. More particularly, in one exemplary aspect, the present disclosure is directed to the intelligent scrambling of control symbols that are transmitted over a network in order to improve undesired electromagnetic emissions.

2. Description of Related Technology

HDMI (High-Definition Multimedia Interface) (see, inter alia, www.hdmi.org) is an exemplary dominant digital audio/video interface technology specified by the HDMI Founders. Current incarnations of the standard specify support for simple networking of digital audio/visual (A/V) interconnects, intended to be used primarily between an arbitrary assembly of multimedia "sources" (e.g., set-top boxes, DVD players, Blu-ray Disc players, video game consoles, computers or CPUs) and "sinks" (e.g., display monitors, home-theater system, etc.). This interconnection is generally unidirectional in nature; i.e., from source to sink, in current implementations.

The current revision of HDMI (HDMI 1.4) utilizes TMDS (Transition Minimized Differential Signaling) to transmit video, audio and auxiliary data over three main HDMI data lanes via one of three modes. FIG. 1 illustrates these TMDS modes in an exemplary 720×480p video frame. The three modes include: (1) a video data period in which the pixels of an active video line are transmitted; (2) a data island period in which audio and auxiliary data are transmitted; and (3) a control period which occurs between video and data island periods. HDMI utilizes TMDS in order to send 10-bit characters that are transmission minimized encoded.

During control periods, control symbols are transmitted repeatedly on the three HDMI main data lanes. HDMI defines four control symbols, representing the four values 0b00, 0b01, 0b10 and 0b11. The value transmitted on lane zero represents whether HSYNC, VSYNC, both or neither is/are being transmitted, and the values transmitted on lanes 1 and 2 are set to non-zero during preambles. Preambles are constructed from eight identical control symbols and are used to signify imminent transitions to data island periods or video data periods. Table 1 illustrates the preambles used for each data period type (i.e., TMDS mode).

TABLE 1

| CTL0 | CTL1 | CTL2 | CTL3 | Data Period Type |
|---|---|---|---|---|
| 1 | 0 | 0 | 0 | Video Data Period |
| 1 | 0 | 1 | 0 | Data Island Period |

Additionally, Table 2 illustrates the control signal-assignment on each of the three main TMDS channels.

TABLE 2

| TMDS Channel (Lane) | D0 | D1 |
|---|---|---|
| 0 | HSYNC | VSYNC |
| 1 | CTL0 | CTL1 |
| 2 | CTL2 | CTL3 |

The two control signals used for each of the TMDS channels are encoded into ten-bit codes as follows:

```
case (D1, D0):
  0,0: q_out [9:0]=0b1.101010100;
  0,1: q_out [9:0]=0b0010101011;
  1,0: q_out [9:0]=0b0101010100;
  1,1: q_out [9:0]=0b1010101011;
endcase;
```

As can be seen from above, these ten-bit codes used for the four control symbols have predominant clock pattern content (i.e., a significant amount of transmissions of 0101 bit-pattern sequences). Furthermore, the control symbols for control values 0b10 and 0b11 are not DC balanced, which results in a significant baseline "wander" during the time that VSYNC is transmitted. Note also that VSYNC is often used in negative parity, which means that the VSYNC value transmitted is "0" when VSYNC is asserted, and "1" when VSYNC is not asserted (depending on the video frame specific resolution details).

HDMI also uses the unique high-transition content of these control symbols to distinguish them from other types of symbols used in HDMI. This is then used by the receiver to perform symbol alignment when first acquiring the incoming signal stream (so-called symbol alignment synchronization).

A result of the repeating of these control symbols during these control periods is the generation of significant electromagnetic emissions. Consequently, these HDMI implementations can become the source of electromagnetic interference (EMI) with nearby wireless services (e.g. Wi-Fi, PAN (e.g., Bluetooth) and cellular services). The resultant radio frequency interference can negatively impact, for example, an end user's Wi-Fi bandwidth and reduce cellular bandwidth or drop cellphone calls when the appropriate wireless services are used simultaneously with HDMI. Such a problem is exacerbated in devices in which HDMI is used in close proximity with other wireless services, such as in a laptop computer or a smart phone.

Accordingly, improved apparatus and methods are needed in order to address these EMI concerns with regards to, inter alia, control symbols such as those used in an exemplary HDMI implementation. Such improved apparatus and methods would ideally reduce the effects of EMI in situations such as when control symbols are transmitted in proximity to other wireless services. More generally, such apparatus and methods would provide for mechanisms that improve the characteristics of the symbols transmitted over the transmission medium, while advantageously leveraging existing hardware so as to minimize circuitry costs in future implementations.

SUMMARY

The aforementioned needs are satisfied by providing, inter alia, improved apparatus and methods for intelligently allocating (e.g., scrambling) control symbols over a communications network.

A method of transmitting data so as to reduce electromagnetic interference associated therewith is disclosed. In one embodiment, the method includes: generating one or more pseudo-random values; and scrambling a plurality of un-encoded control symbols into a scrambled control symbol, the scrambling based at least in part on the one or more pseudo-random values; where the transmission of the scrambled control symbol minimizes undesirable electromagnetic radiation and interference.

In one variant, the plurality of un-encoded control symbols is associated with a High-Definition Multimedia Interface (HDMI) interface.

In another variant, the pseudo-random value is generated based on a transmitting linear feedback shift register (LFSR). In some implementations, the method includes transmitting a scrambler reset (SR) symbol to reset a receiving LFSR. In alternate implementations, the receiving LFSR is self-synchronizing. Certain embodiments may force the receiving LFSR to a known value to self-synchronize. In some cases, the known value comprises a channel number selected from a plurality of channel numbers.

A non-transitory computer-readable medium containing at least one computer program is disclosed. In one embodiment, the computer program is configured to, when executed by a processor, cause the processor to: generate a pseudo-random value; scramble a plurality of un-encoded control symbols using the pseudo-random value; and for each scrambled un-encoded control symbol: select a scrambled control symbol from a data structure, the selection based on the scrambled un-encoded control symbol, where each scrambled control symbol of the data structure is characterized by desirable electromagnetic interference (EMI) properties; and transmit the selected scrambled control symbol.

In one variant, the pseudo-random value is generated via at least a linear feedback shift register (LFSR). In some cases, the pseudo-random value includes a subset of a plurality of bits of the LFSR. For example, the subset may include the four (4) least significant bits of the LFSR output.

In other variants, the plurality of un-encoded control symbols is further subdivided into a plurality of channels. Certain implementations may further scramble the plurality of un-encoded control symbols based at least in part on a channel associated with each un-encoded control symbol.

In still other implementations, the processor is further configured to alternate transmissions between scrambled control symbols and non-scrambled un-encoded control symbols.

In some variants, the data structure comprises a lookup table.

A method of transmitting data to minimize radio frequency interference is disclosed. In one embodiment, the method includes: selecting a plurality of encoded values to represent scrambled control symbols; using at least a pseudo-random value, scrambling a plurality of un-encoded control symbols so as to generate a bit string; selecting one of the plurality of encoded values to be transmitted, the selecting using the generated bit string; and transmitting the selected one of the plurality of encoded values.

In one variant, the plurality of encoded values representing scrambled control symbols comprises a set of sixteen 10-bit values.

In other variants, the pseudo-random value is generated using a linear feedback shift register (LFSR). In one such case, the pseudo-random value comprises the least significant four (4) bits of a pseudo-random LFSR value.

In other variants, the generated bit string comprises a 4-bit value.

In still other variants, one of the plurality of un-encoded controls symbols is transmitted more than once.

In another aspect of the present disclosure, an apparatus is disclosed. In one embodiment thereof, the apparatus includes: a transmitting linear feedback shift register (LFSR); and an electronic circuit configured to: receive a plurality of un-encoded control symbols and a plurality of data symbols; generate one or more pseudo-random values based on the transmitting LFSR; and scramble only the plurality of un-encoded control symbols, the plurality of un-encoded control symbols being scrambled with the generated one or more pseudo-random values in order to produce a plurality of corresponding pseudo-random values, where a plurality of scrambled corresponding control symbols are retrieved from a lookup table based on the plurality of corresponding pseudo-random values generated using the scrambling; wherein: transmission of the plurality of scrambled corresponding control symbols minimizes undesirable electromagnetic radiation and interference; the receiving LFSR comprises a self-synchronizing LFSR; and the receiving LFSR is forced to a known value to self-synchronize, the known value comprising a channel number selected from a plurality of channel numbers.

Other features and advantages will immediately be recognized by persons of ordinary skill in the art with reference to the attached drawings and detailed description of exemplary embodiments as given below.

DETAILED DESCRIPTION

Figure 1:
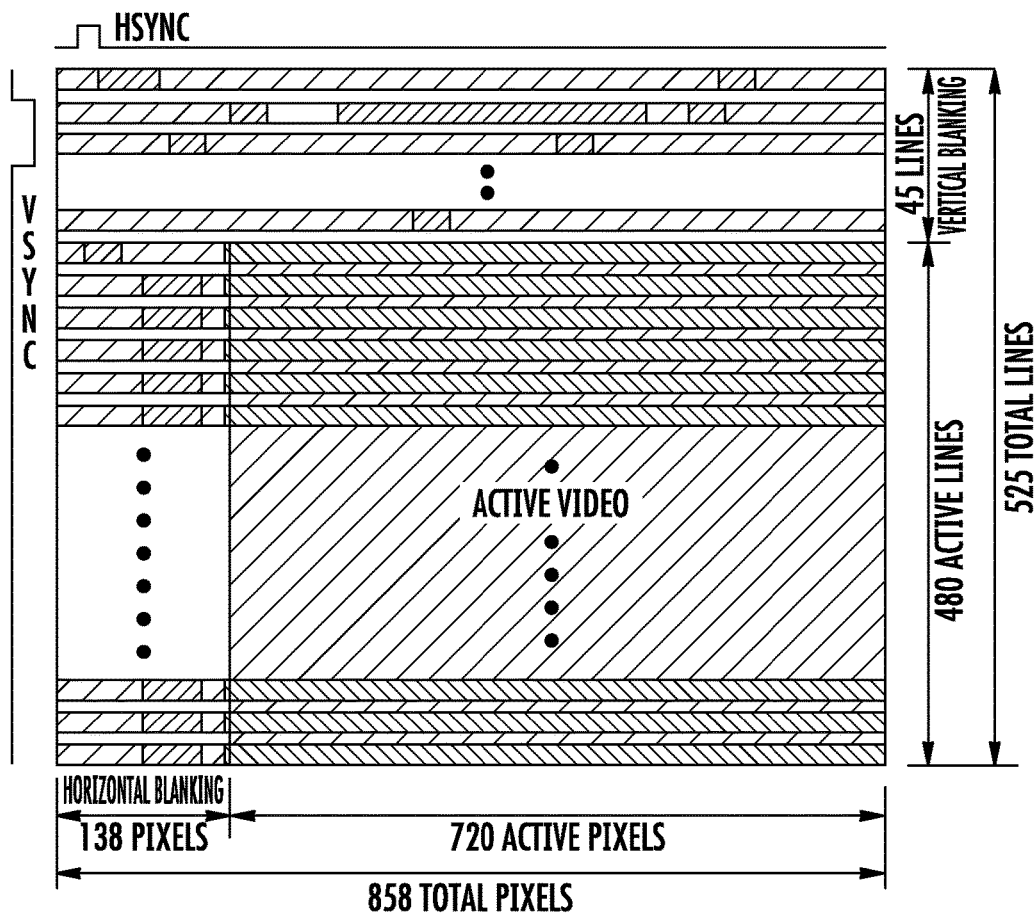
FIG. 1 is an exemplary prior art HDMI 720×480p video frame.

Reference is now made to the drawings, wherein like numerals refer to like parts throughout.

Overview

In one salient aspect, methods and apparatus for the scrambling of control symbols are disclosed herein. In one embodiment, the control symbols are associated with an HDMI interface, and the methods and apparatus are configured to scramble the symbols to as to mitigate the effects of electromagnetic interference (EMI) created by the transmission of otherwise unscrambled sequences of symbols (such as during control periods) which may contain significant "clock patterns" or other undesirable artifacts.

In one exemplary implementation, pseudo-random values are utilized in order to spread a finite set of control symbols (in which a given control symbol within that finite set is expected to be repeatedly transmitted) onto a respective set of random values. In one exemplary embodiment, this set of random values will be larger in size (e.g., sixteen (16) random values in the set) than the finite set of control symbols, and are theoretically equally distributed throughout the larger set. Un-encoded control symbols are scrambled using the pseudo-random value, and the scrambled control symbols are preselected so that they contain desirable numeric properties such that their transmission over a transmission medium (e.g., wireline connection) minimizes undesirable electromagnetic radiation and interference.

In addition, exemplary embodiments of the apparatus and methods of the disclosure take advantage of knowledge about the existing system including: (1) the expected timing/frequency of transmitted control symbols (e.g. their position within an exemplary HDMI frame); and (2) the EMI costs associated with expected control symbol transmission patterns so that these EMI costs can be improved upon.

Moreover, exemplary implementations set forth herein advantageously do not introduce any costs in terms of communications bandwidth, in order to ensure that the system bandwidth is fully utilized whether or not control symbols are scrambled. Ideally, implementations in accordance with the disclosure can leverage existing hardware and communications protocols in order to accomplish these objectives.

Detailed Description of Exemplary Embodiments

Exemplary embodiments are now described in detail. While these embodiments are primarily discussed in the context of an HDMI audio/visual (A/V) component network, it will be recognized by those of ordinary skill that the present disclosure is not in any way limited to HDMI applications. In fact, the various aspects set forth herein are useful in any network that can benefit from the reduction of electromagnetic interference, such as in instances where transmitted symbols include predominant clock pattern content in order to improve DC-balance on the transmission medium.

As used herein, the term "HDMI" refers without limitation to apparatus and technology compliant with "HDMI Specification"—Version 1.4b, dated Oct. 11, 2011; which is incorporated herein by reference in its entirety, and including any prior or subsequent revisions thereof.

Furthermore, while these embodiments are disclosed in a serial transmission of digital data represented as electrical levels, ones having ordinary skill in the related arts will recognize that the various techniques may also extend to other systems and applications including, inter alia, multi-level wired systems (e.g., three-level encoded Ethernet), and modulated transmission schemes (e.g., a high frequency carrier that is modulated in the amplitude or frequency domain {AM or FM} by the signals being transmitted).

Methods—

As discussed previously, embodiments of the present disclosure seek to avoid repeated transmissions of control symbols that have predominant clock pattern content, as these repeated transmissions can result in spurious electromagnetic interference.

Figure 2:
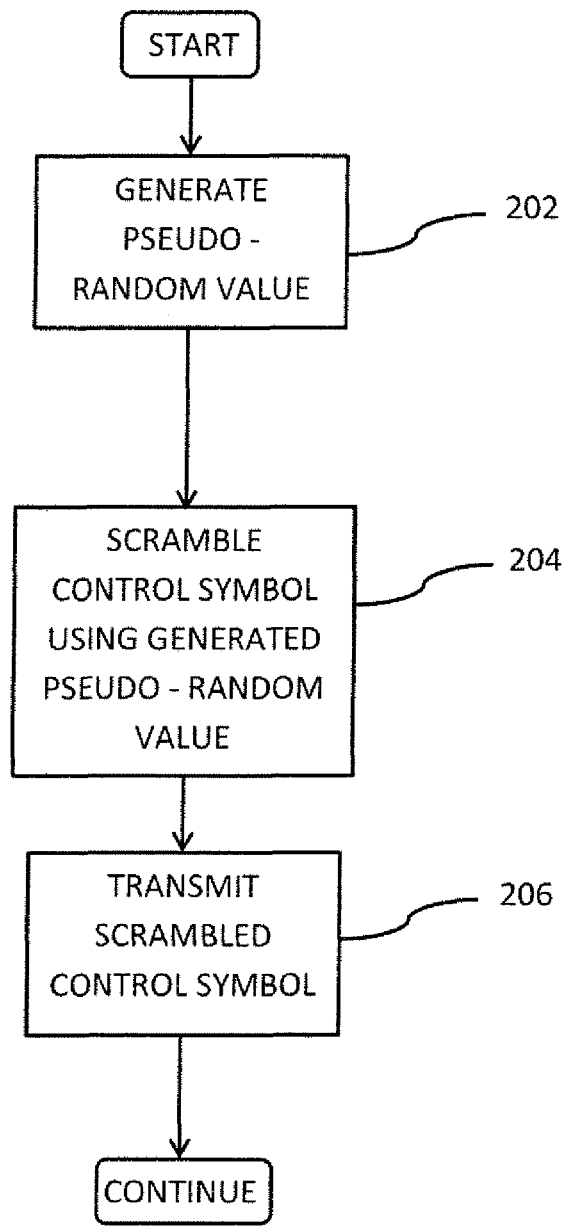
FIG. 2 is a logical flow diagram illustrating the process steps for transmitting scrambled control symbols in accordance with one embodiment.

Referring now to FIG. 2, exemplary methodology 200 for scrambling control symbols (such as the aforementioned HDMI control symbols) into DC-balanced control symbols without significant clock pattern content (e.g., scrambled control symbols), and subsequently transmitting them is shown and described in detail.

At step 202 of the method 200, pseudo-random values are generated based in part on a given control symbol value associated with a given control symbol. For example, pseudo-random values may be generated for the control values ("D1" and "D2") associated with various HDMI control symbols discussed previously herein with regards to Table 2. Generally speaking, these control symbols contain or are likely to contain predominant clock pattern content, which results in deleterious effects on other forms of data transmission if these control symbols were transmitted in the clear (i.e. unscrambled). Furthermore, any symbols that are transmitted repeatedly will generate egregious and spurious emissions spurs at harmonics of one-fifth the bit rate, regardless of whether they have significant clock pattern content or not. Accordingly, these generated pseudo-random values are utilized in order to spread a finite set of control symbols (e.g. four (4)), in which a given control symbol within that finite set is expected to be repeatedly transmitted, onto a respective set of random values. In an exemplary embodiment, this set of random values will be larger in size (e.g., sixteen (16) random values in the set) than the finite set of control symbols, and are theoretically equally distributed throughout the larger set.

In one implementation of the invention, these pseudo random values are generated using a linear feedback shift register (LFSR). While the use of LFSR's is exemplary, it is appreciated that other methods of random number generation may be readily utilized including both: (1) hardware-based random number generation; and (2) software-based random number generation. In one embodiment, the output of the pseudo-random number generator is deterministic given, for example, a known seed value. Such a property is desirable in that the random value generated in the transmitting device can be replicated and/or synchronized accurately with a receiving device. In addition, in embodiments of the invention in which the scrambled lane number is also transmitted (as discussed subsequently herein), thereby effectively sending the sink the value that will be used to scramble the next few symbols, all that is required is that the source implement a small shift register. The source can then shift the register up a place and put a real random bit into the bottom position each cycle.

In one exemplary embodiment, the LFSR is a 16-bit LFSR and the least significant four (4) bits of the LFSR are used to generate a set of 16 random values. It is appreciated that in some variants, a different set of four (4) bits may be used (e.g., most significant 4 bits, etc.). In still other variants, the random value may be extended to five (5) bits, six (6) bits, etc. by e.g., selecting a greater (or fewer number of bits of the LFSR); the resulting random value can be scrambled with the four bit unscrambled value by padding the unscrambled value with additional 0's or 1's For example, in one variant, the four (4) bits of the unscrambled value ('ABCD') can be padded to generate a five (5) bit value (e.g., 0ABCD, 1ABCD, ABCD0, ABCD1, A0BCD, AB1CD, etc.). The resulting five (5) bit value can be exclusively OR'd with the five bit random value generated from the selected bits of the LFSR to generate an index into the lookup table of scrambled control values to be transmitted. Those of ordinary skill will recognize that larger lengths can be used to represent larger sets (e.g., five (5) bits can be used to index a lookup table with 32 values, six (6) bits can index 64 values, etc.).

At step 204 of the method, the un-encoded control symbol is scrambled using the pseudo-random value generated at step 202. In one embodiment, the scrambled control symbols are preselected so that they contain desirable numeric properties such that their transmission over a transmission medium minimizes undesirable electromagnetic radiation and resultant EMI. The number of preselected scrambled control symbols can be chosen from any sufficiently large set such that the random transmission of these scrambled control symbols possesses characteristics that are desirable when placed in proximity to other transmission mediums (whether wired or wireless). In an exemplary implementation, these preselected scrambled control symbols are selected out of a lookup table based in part on the random value generated at step 202. In other words, the random values generated at step 202 are each associated with a given preselected scrambled control symbol.

In one embodiment, the association of random values with a given preselected scrambled control symbol is governed by a one-to-one relationship. In other words, each preselected scrambled control symbol has a unique random value that is associated with it. Accordingly, a scrambled control symbol in this embodiment will always be allocated to a corresponding random value.

Alternatively, the association of random values with a given preselected scrambled control symbol is governed by a one-to-many relationship, where a given preselected scrambled control symbol has two or more random values associated with it that will trigger its selection.

Furthermore, the association between random values and a preselected scrambled control symbol can be the same throughout the entire set of preselected scrambled control symbols (e.g., there are exactly two random values associated with each given preselected scrambled control symbol), or alternatively can be heterogeneous in nature. The use of heterogeneous associations are desirable in instances for example, where one subset of scrambled control symbols has more desirable EMI properties than another subset of scrambled control symbols. In those instances, it may be desirable to increase the likelihood that the more desirable scrambled control symbols are selected more often, and hence one can increase the probability that a given scrambled control symbol within the more desirable subset gets chosen. Such a configuration has benefits over a one-to-one mapping by further "spreading" the scrambled control symbols over a larger number of random values at the expense of additional system complexity. These and other variations would be readily apparent to one of ordinary skill given the present disclosure.

Alternatively, DC balanced line codes can also be readily used in place of, or in addition to, preselected scrambled control symbols. Line codes are codes which format a digital signal that is to be transmitted over a communication medium into a form that is better optimized for transmission over a given physical channel. Consequently, a line code will typically be chosen to complement the physical capabilities of a given transmission medium, such as optical fiber or shielded twisted pair copper wire. These characteristics are unique for each transmission medium as each medium has different characteristics associated with it such as signal distortion characteristics, capacitance, etc.

Many of these line codes are optimized for long-distance or high-speed communication channels that are hindered when transmitting a signal with a DC component. This DC component present within a signal is also known as a disparity, bias, or the DC coefficient. Line codes which aim to eliminate the DC component of a transmitted signal are known as DC-balanced line codes.

Constant-weight line codes (such as e.g., a Manchester II code utilized in the Auxiliary Channel of a DisplayPort network) are a first type of DC balanced line code that is designed so that each transmitted code word is balanced in a way that for each positive value within a code word, a substantially equal number of negative values exists. Accordingly, constant-weight line codes transform a signal to be transmitted such that the average power level over each code word is balanced.

Paired disparity line codes, on the other hand, are designed such that for every code word that averages to a negative level, another code word exists in the data stream that averages out to a positive level, thereby balancing out the transmitted signal. Paired disparity line codes typically work by keeping track of the running DC buildup at the transmitter. By keeping track of the running DC buildup, code words that tend to balance the DC level back towards zero can be selected at the transmitter. Examples of paired disparity line codes include 8B/10B line code. The use of DC balanced line codes in the context of scrambled control symbols is described in co-owned and co-pending U.S. patent application Ser. No. 12/976,274 filed Dec. 22, 2010 and entitled "Methods and Apparatus for the Intelligent Association of Control Symbols", the contents of which are incorporated herein by reference in its entirety.

The foregoing schemes provide control symbols that are scrambled and DC-balanced. However, it is further appreciated that non-DC balanced control symbols may be used in a similar capacity. Moreover, in an alternative embodiment, non-DC balanced control symbols can be selected for other desirable properties including further reduction of EMI. However, those of ordinary skill in the related arts will recognize that an arbitrary set of non-DC balanced symbols can potentially lead to an unbounded running disparity (or statistically bounded running disparity), resulting in undesirable baseline wander.

Accordingly, various embodiments use a lookup table of scrambled control symbols, where the lookup table values have been selected to maintain a running disparity of zero on a statistical basis even though individual ones of the scrambled control symbols may not be DC balanced. For example, in variants where each control symbol has an equal likelihood of transmission, the lookup table has the property where the overall number of 1's and 0's are equal. Specifically, the indices used to select the symbols from the lookup table are generated by exclusively OR'ing an unscrambled value with a pseudo-random value extracted from the LFSR; therefore each control symbol is equally likely. While the running disparity will be non-zero after transmitting a particular control symbol, the long term statistical probabilities ensure that the running disparity will "center" around zero. In alternate variants where certain symbols have a higher likelihood of transmission, the 1's and 0's may be weighted accordingly, so as to retain this property.

While the aforementioned statistical schemes can provide long term stability, mere statistical selection alone does not guarantee a bounded running disparity (larger running disparity values have an increasingly small probability of occurring, but the probability is non-zero). Thus, in some embodiments, the lookup table is further subdivided into two or more subsets (which may be equal): a positive disparity (i.e., control symbols with more 1's than 0's), and a negative disparity (i.e., control symbols with more 0's than 1's). During operation, the lookup table which compensates for the current running disparity is used for generating the scrambled control symbols. For example, if the running disparity is positive, the lookup table with a negative disparity is used, and similarly where the running disparity is negative, the lookup table with a positive disparity is used. In still other variants, the lookup table may be further subdivided into additional subsets (e.g., very positive disparity, positive disparity, negative disparity, very negative disparity, etc.).

Referring back to FIG. 2, at step 206, the scrambled control symbol is transmitted across a transmission medium (e.g., wireline or wireless interface) from a transmitting or source device to a receiving or sink device. In one variant, the scrambled control symbol is not transmitted unless or until the random value generation is synchronized between the transmitting device and the receiving device. In an alternative variant, the use of self-synchronizing scramblers is used to transmit scrambled control symbols thereby obviating the need for the receiver to implement a random number generator (e.g. an LFSR).

Furthermore, because the transmitting device scrambler is self-synchronizing, the specific self-synchronizing LFSR chosen is not important; i.e., the receiver doesn't need to know the specific LFSR that is being used to scramble the control symbol.

Various embodiments, may additionally update one or more operational metrics. In one exemplary embodiment, a running disparity count is updated after each control symbol has been transmitted. The running disparity count can be used to assist in proper selection of the subsequent non-DC balanced control symbols. Common examples of operational metrics include, without limitation: transmitted symbol, running disparity, consecutive ones (or zeros), transmit power, etc.

Figure 3:
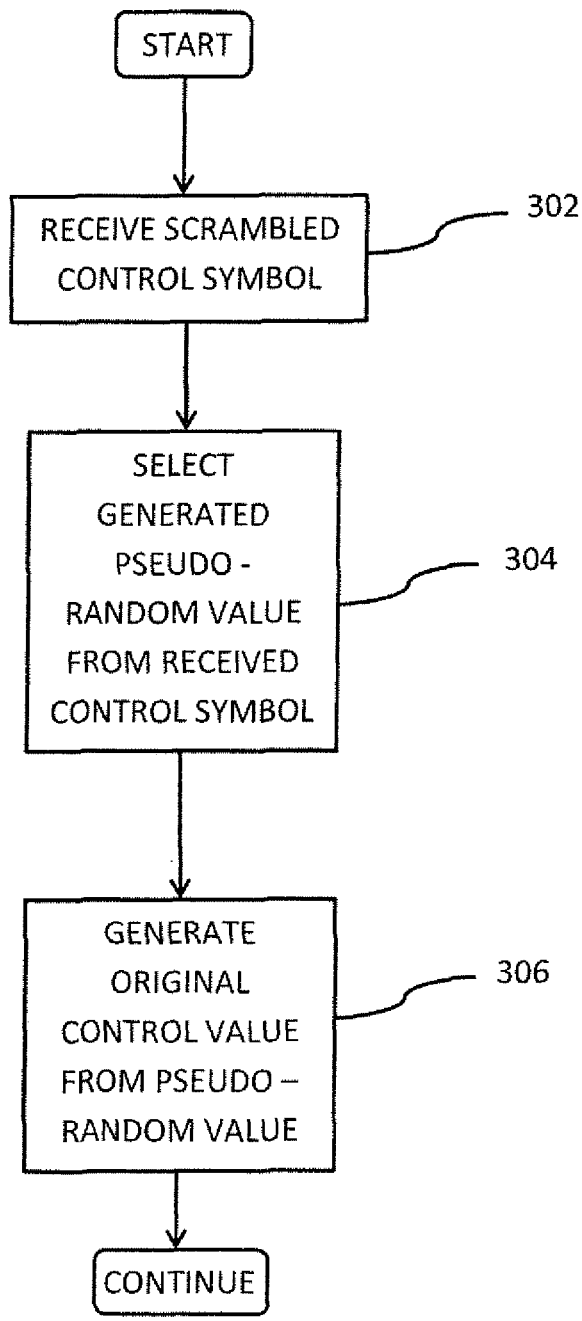
FIG. 3 is a logical flow diagram illustrating the process steps for determining an un-encoded control symbol associated with a received scrambled control symbol in accordance with one embodiment.

Referring now to FIG. 3, exemplary methodology 300 for determining a control value (such as the control values associated with the aforementioned HDMI control symbols) based on a received scrambled control symbol is shown and described in detail. At step 302, the scrambled control symbol (as described in, for example, FIG. 2) is received at the sink device. In one exemplary implementation, the sink device will discard any received scrambled control symbols until its random number generator is synchronized with the transmitting device.

At step 304, the generated pseudo-random value is selected based on the scrambled control symbol received at the receiver. In one embodiment, the scrambled control symbol is used as an input to a lookup table. The lookup table in the receiving device will, in the exemplary case, essentially be the reverse of the lookup table utilized in the transmitting (source) device. In other words, for a given scrambled control symbol, a random value (i.e., the random value generated at step 202 of methodology 200) is output from the lookup table.

Figure 5:
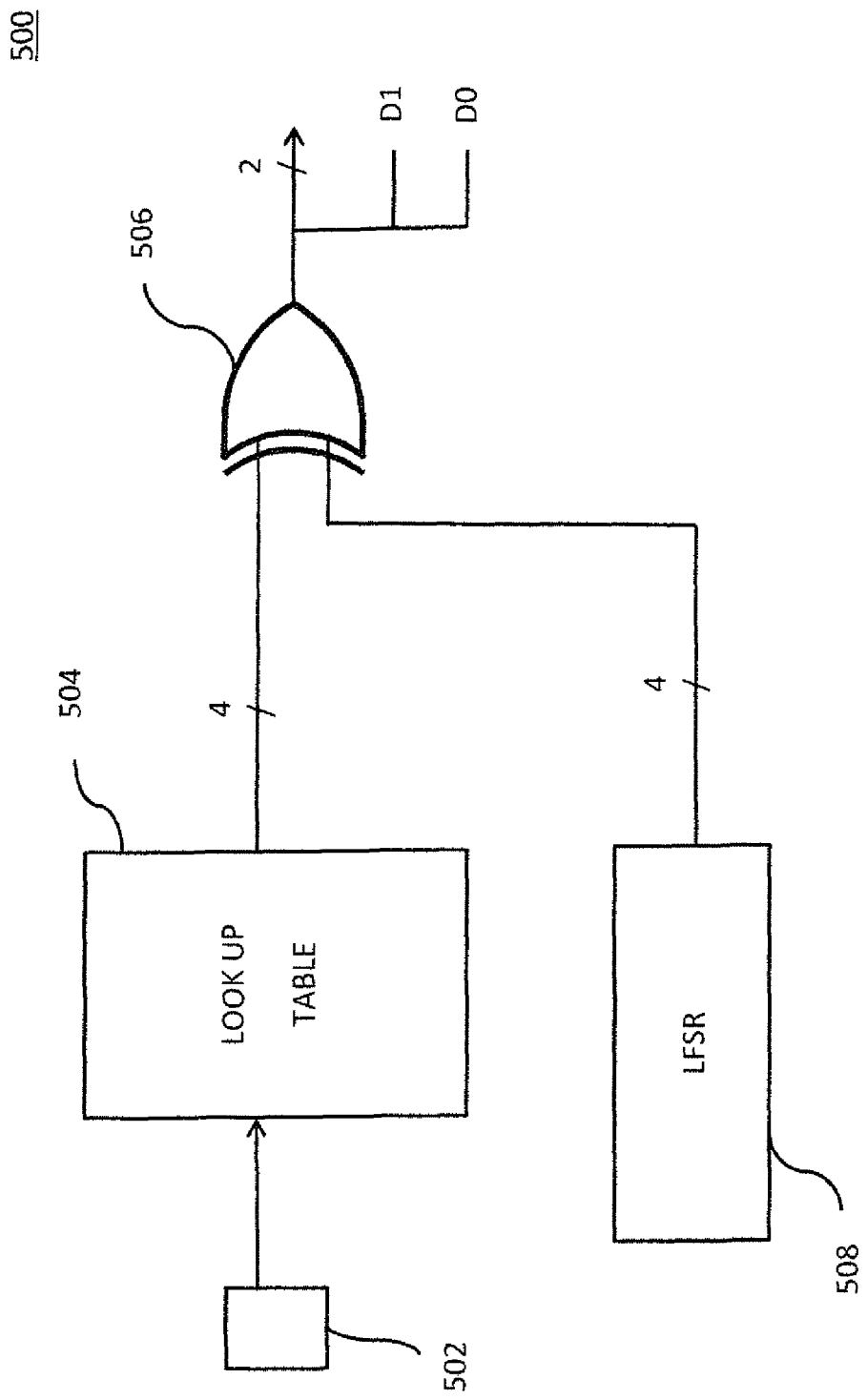
FIG. 5 is a functional block diagram illustrating one embodiment of a circuit adapted to implement the unscrambling of scrambled control symbols in accordance with the disclosure.

At step 306, a control value is generated from the pseudo-random value selected at step 304. In one implementation, the control value can be generated so long as the receiving device knows how the received scrambled control symbol was constructed. For example, in one variant, the receiving device will have a matching lookup table and a synchronized random value generator (e.g., an LFSR) with the transmitting device. Given this information, the receiving device can properly reconstruct the original control symbol value. One exemplary circuit for reconstructing the original control symbol value is illustrated in FIG. 5, discussed subsequently herein. Exemplary specific implementations for the generalized method described in FIGS. 2 and 3 are now discussed.

Example No. 1

In a first exemplary implementation, a method for transmitting a scrambled control symbol in the context of an HDMI system is disclosed. As discussed previously herein (in the context of an HDMI system), the ten-bit codes that are used for the four control symbols within the HDMI specification have predominant clock pattern content (i.e., a significant amount of transmissions of 0101 bit-pattern sequences). Previous solutions for improving the DC-balance on a transmission medium, such as those disclosed in co-owned and co-pending U.S. patent application Ser. No. 12/976,274 filed Dec. 22, 2010 and entitled "Methods and Apparatus for the Intelligent Association of Control Symbols", previously incorporated herein by reference in its entirety, can be enhanced in terms of EMI reduction in HDMI and similar applications. This is due in large part to the significant clock pattern content in each of the control symbols within the HDMI specification. Accordingly, generating a random sequence using only these four values may still generate undesirable EMI emissions at specific frequencies; i.e., the harmonics of the clock pattern incorporated into these control symbols. Furthermore, selecting randomly between four symbols is still likely to generate repeats at a harmonic of the line rate.

In order to address these issues, a set of ten-bit scrambled control symbol values is chosen for use to represent the control symbols to be used for transmission of the HDMI wireline interface. In an exemplary implementation, the set will consist of sixteen (16) ten-bit values. The set of sixteen (16) control symbol values is open, and is chosen such that the values are distinct from any other ten-bit values used in TMDS signaling. These ten-bit values should also be DC balanced (i.e., contain five zeros and five ones). In the context of TMDS, there are currently some one-hundred fifty (150) ten-bit values in TMDS that meet these criteria. Preferably, the subset of sixteen (16) scrambled control symbol values of these one-hundred fifty (150) ten-bit values are chosen in order to provide the most desirable EMI characteristics, although other criteria may be used as a or the basis for selection, consistent with the invention.

As discussed previously herein, HDMI defines four (4) different control symbol values (0b00, 0b01, 0b10, 0b11). In order to scramble the HDMI defined control symbols, a 16-bit internal LFSR, such as that defined in the DisplayPort specification, is used. More specifically, the four least significant bits of the 16-bit LFSR are used to scramble the HDMI control symbol values. The characteristic polynomial for this 16-bit internal LFSR is set forth below at Equation (1).

$$G(X)=X16+X5+X4+X3+1 \qquad \text{(Equation 1)}$$

In order to scramble the desired control value (0b00, 0b01, 0b10, 0b11) using the least significant four bits of the pseudo-random LFSR as set forth in. Equation (1) above, the control symbol value is XOR'd with the least significant two bits of the LFSR, thereby yielding a 2-bit value. The remaining two bits of the least significant four bits are appended to the XOR'd bits and form the basis as the input bits to a lookup table. See, for example, FIG. 4 discussed subsequently herein. This resulting 4-bit value is then used to select a 10-bit scrambled control symbol that will ultimately be transmitted over the HDMI wireline interface.

At the receiver, the received 10-bit scrambled control symbol is decoded using a lookup table to yield the original 4-bit random value that was used as an input to the transmitting device lookup table. The least significant two bits of this 4-bit value are then XOR'd with the bottom two bits of the receiver's LFSR to yield the descrambled control value. In order to accomplish this, the LFSR in the source and the sink need to be synchronized, and in order to maintain this synchronization, the LFSR is in one exemplary embodiment advanced after each symbol is transmitted. This not only includes the aforementioned control symbols, but every symbol that is transmitted and received. By doing this, it ensures that the receiving LFSR stays in synchronization with the transmitting LFSR, even in the presence of bit errors. See for example, FIG. 5 discussed subsequently herein.

In implementations where an LFSR is used that does not have a reset mechanism defined, one technique for maintaining synchronization includes selecting a further set of four control symbols indicating e.g., "Scrambler Reset 1" (SR1), and a further four similarly representing "Scrambler Reset 2" (SR2). The first four scrambled control symbols that are transmitted at the start of every five-hundred and twelve (512) scan lines are replaced by a corresponding Scrambler Reset control symbol in the pattern SR1, SR2, SR2, SR1. After transmitting the final SR1, the LFSR is reset to 0xFFFF, so that the next control symbol to be transmitted is scrambled with 0xF.

Accordingly, the receiver only resets its LFSR when it receives a sequence containing at least two Scrambler Reset control symbols of the type SR1 and SR2 in the pattern SR1, SR2, SR2, SR1 (e.g. SR1, SR2, X, X, or X, SR2, X, SR1, etc.). By doing this, the receiver is enabled to identify the precise transmission and position of the transmitted sequence, even in the presence of bit errors. The receiver resets its LFSR after the position of the final SR1. The transmitter selects which of the four possibilities for SR1 or SR2 to transmit depending on the control value to be transmitted. The receiver decodes the control value during scrambler reset accordingly.

In another variant, the unscrambled SR symbols are transmitted at the start of every line, which provides faster synchronization for the first time, and faster re-synchronization should it be needed.

Example No. 2

As discussed previously herein in the context of an exemplary HDMI system, the ten-bit codes that are used for the four control symbols within the HDMI specification have predominant clock pattern content (i.e., a significant amount of transmissions of 0101 bit-pattern sequences). Similar to the exemplary implementation (Example No. 1) discussed previously, a set of 10-bit values is chosen for use to represent scrambled control symbols to be used for transmission of the HDMI wireline interface. In this second exemplary implementation, the set consists of sixteen (16) 10-bit values. In order to scramble the HDMI defined control symbols, a 16-bit internal LFSR is used. More specifically, and similar to the previous embodiment discussed herein, the four least significant bits of the 16-bit LFSR are used to scramble the HDMI control symbol values.

In order to scramble the desired control value (0b00, 0b01, 0b10, 0b11) using the least significant four bits of the pseudo-random LFSR as set forth in Equation (1) above, the control symbol value is XOR'd with the least significant two bits of the LFSR. The remaining two bits of the least significant four bits are XOR'd with the channel number (i.e., lane number) of the control symbol. See for example, FIG. 6 discussed subsequently herein. The resultant scrambled four-bit value then forms the basis as the input bits to a lookup table and will, in general, be uncorrelated between all three channels (lanes). Hence, the encoded 10-bit data corresponding to the value to be transmitted on all three lanes will be uncorrelated. Furthermore, the emissions will be uncorrelated, and so, when viewed in the frequency domain, will add in a root-mean-square (RMS) relationship rather than linearly. This resulting 4-bit value is then used to select a 10-bit scrambled control symbol that will ultimately be transmitted over the HDMI wireline interface.

Example No. 3

Many LFSR's have a so-called "self-synchronizing" property, wherein if the value of the least significant bit before scrambling is known, then the least significant bit of the receiver's LFSR can be forced to this value. After a bounded number of cycles, the receiver's LFSR will become fully synchronized with the transmitter's LFSR. The use of these or other types of "self-synchronizing" LFSR's avoids the need for the transmission of explicit scrambler reset sequences as set forth in previous examples described above. One such exemplary LFSR which possesses this self-synchronizing property is disclosed in *IEEE Std. 1394a—2000 High Performance Serial Bus—Amendment 1*, the contents of which are incorporated herein by reference in its entirety. The characteristic polynomial for this LFSR is set forth below in Equation (2).

$$G(X)=X11+X9+1 \qquad \text{(Equation 2)}$$

Similar to that described previously, the channel number (i.e., lane number) is scrambled with the bottom two bits of the LFSR, and the control value is scrambled with the next two bits from the LFSR. The scrambler is synchronized after the appropriate number of received symbols. Prior to this, the descrambled control values are ignored which only occurs at the start-up of the device. Once the scrambler is synchronized, the descrambled value of the lane count is verified to be correct, and if not, then the process of scrambler synchronization is restarted. Accordingly, because the scrambler can only lose synchronization due to a failure somewhere in the system, the use of a self-synchronizing LFSR advantageously offers a desirable robustness feature for the exemplary scrambling hardware of the present disclosure.

Example No. 4

When using a scrambler (e.g., an LSFR) such as that defined in Equation (2) above, which have no feedback paths between the four least significant bits; these four least significant bits represent a simple shift register. In other words, the generating function for the LFSR does not contain the terms X3, X2 or X1. By scrambling the channel number with the bottom two bits, the receiver can identify the state of these bottom two bits in the transmitter's LFSR (as described in Example No. 3 above) as the receiver is separately aware of what the channel number of a received symbol should be.

In one variation, the transmitter LFSR is shifted by two places between each symbol. Thus the two bits used to scramble the channel number for one symbol (hereinafter referred to as a "scramble key") will be used to scramble the control value in the next symbol. In one implementation, the receiver remembers the value of the scramble key, and uses it to descramble the control value of the next symbol. The bottom two bits of the next symbol are XOR'd with the channel number, and provide the new scramble key for use to descramble the successive control symbol. The result of this process is that the receiver does not have to implement an LFSR and again, no scrambler reset symbols need be transmitted between the transmitting device (e.g., source) and the receiving device (e.g., sink). See for example, FIG. 7, discussed subsequently herein. Furthermore, this technique is suitable for any LFSR with no feedback terms between the least significant four bits. The transmitter may therefore choose to implement any LFSR that satisfies this property. The scrambler is advanced only after transmitting control symbols, and the scramble key is defined to be 0b11 for the very first control symbol.

In an alternative variant, the LFSR is advanced by one place after transmitting each symbol, and the receiver "shifts up" the decoded value of the lane count into the scramble key. Thus in this variant, the scramble key contains one bit from the previously transmitted scrambled value of the lane count, and one bit from the scrambled value before that.

Example No. 5

Current versions of HDMI require that the TMDS sink determine the location of character boundaries in the serial data streams. Once character boundaries are established on all of the data channels, the sink is defined to be synchronized to the serial streams, and may recover TMDS characters from the data channels for decode. In order to accomplish this, the TMDS data stream provides periodic cues for decoder synchronization. For example, the TMDS characters used during the Video Data Period and Data Island Period contain five (5) or fewer transitions, while the TMDS characters used during the Control Period contain seven (7) or more transitions. The high-transition content of the characters transmitted during the Control Period form the basis for character boundary synchronization at the decoder. While these characters are not individually unique in the serial data stream, they are sufficiently alike that the decoder may uniquely detect the presence of a succession of them during transmitted synchronization intervals. The sink is required to establish synchronization with the data stream during any Control Period greater than or equal to $t_{Smin}$ twelve (12) characters in length.

However, it should be noted that the scrambling that is described in, for example, FIG. 2 destroys the character boundary recognition defined in current versions of HDMI as the high-transition content has been effectively removed from the scrambled control symbols. Accordingly, in order to meet this requirement, and assuming the use of a self-synchronizing LFSR as set forth in, for example, Example No. 3 above, the transmitter periodically transmits a sequence of twelve (12) control symbols encoded using HDMI 1.4b encoding (and not scrambled), or a variant thereof to ensure DC balance, not more often than once every four scan lines on a given channel. Additionally, the transmitter transmits an extended Control Period of thirty-two (32) symbols not more often than once every frame. This replaces the twelve (12) symbol sequence described above, so that no unscrambled control sequence is transmitted more often than once every four scan lines on a given channel These sequences are not transmitted simultaneously on more than one lane, in order to minimize the EMI impact. Note that the LFSR is not advanced while transmitting these sequences. Thus each lane must implement its own LFSR. The recommended variant to ensure DC balance uses the following codes in place of those defined in the HDMI Specification (see above):

case (D1, D0):
1, 0: q_out[9:0]=0b1011010100;
1, 1: q_out[9:0]=0b0100101011;
endcase;

In this manner, the impact of the high clock pattern content (unscrambled) control symbols is minimized while preserving the desirable electromagnetic emission properties of the scrambled control symbols that are used throughout the remainder of the HDMI frame.

Apparatus—

Figure 4:
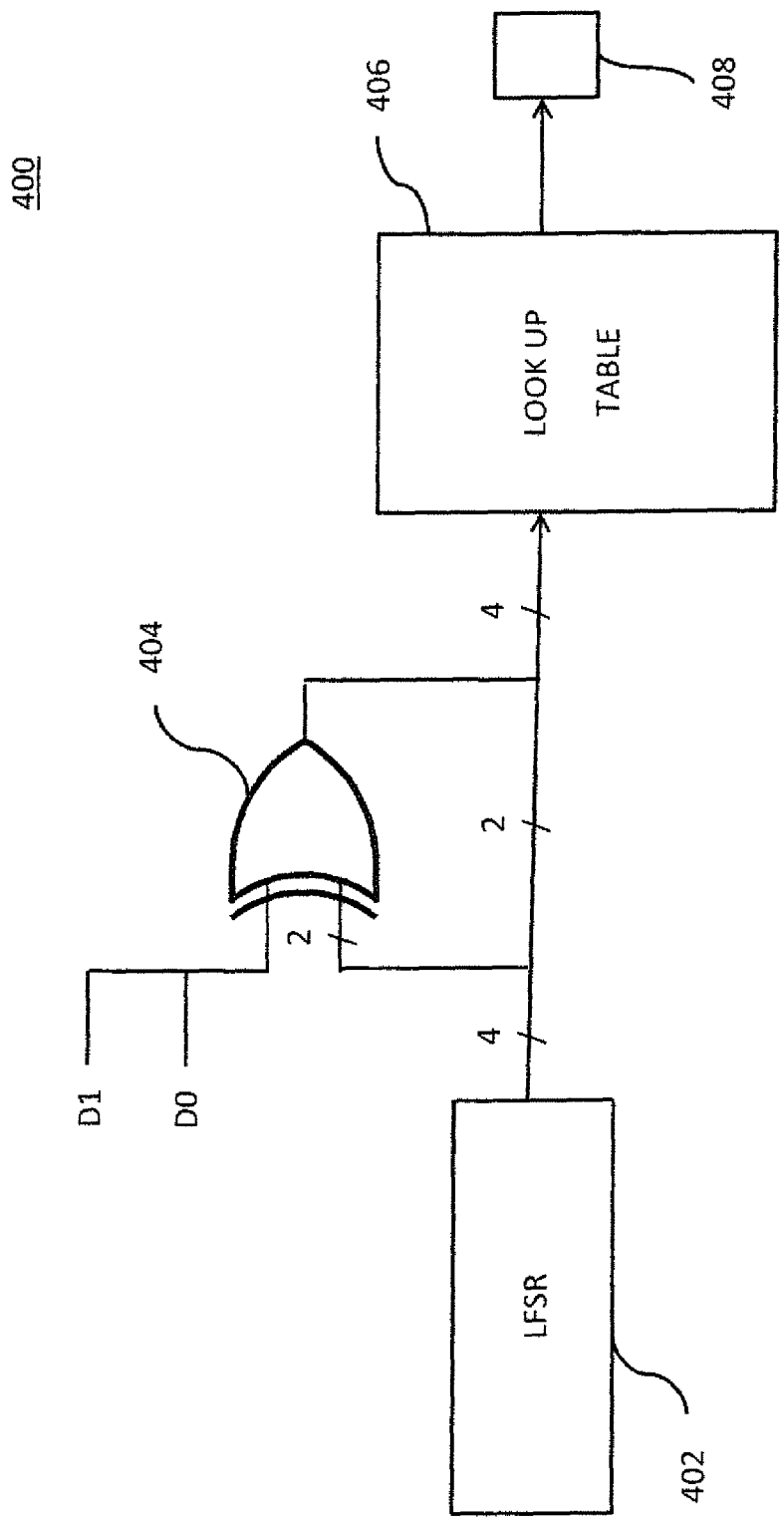
FIG. 4 is a functional block diagram illustrating one embodiment of a circuit adapted to implement the scrambling of control symbols in accordance with the disclosure.

Referring now to FIG. 4, an exemplary embodiment of a circuit 400 adapted for the transmission of scrambled control symbols is illustrated. The circuit illustrated in FIG. 4 is shown implemented in hardware, although it is appreciated that the logic illustrated in FIG. 4 could readily be implemented in software, or combinations of hardware and software, as well.

The circuit 400 includes an LFSR 402 which is advantageously used because the operation of the LFSR is deterministic, while also providing a sequence of bits that appears random. Accordingly, and as discussed previously herein, synchronization between transmitter and receiver can be maintained if the cycles between the LFSR at the transmitter and the LFSR at the receiver remains synchronized, and both LFSR's are loaded with the same seed value. In an exemplary embodiment, the LFSR is a 16-bit LFSR, although it is appreciated that other LFSR's could readily be substituted such as those described previously herein. When using an exemplary 16-bit LFSR, a subset of bits (e.g. the four (4) least significant bits) is used for control symbol encoding.

Of this subset of bits, an additional subset (e.g. the two (2) least significant bits of the subset) is fed into an XOR logic gate 404 along with control signals D1 and D0. The output of the XOR logic gate is then combined with the remaining bits from the additional subset (e.g. the two (2) most significant bits of the subset) to produce a 4-bit random value. This random value is then fed into a lookup table 406. The lookup table then chooses a scrambled control symbol value and forwards this scrambled control symbol value to transmitter 408. The scrambled control symbols are in the exemplary embodiment preselected so that they contain desirable numeric properties such that their transmission over a transmission medium minimizes undesirable electromagnetic radiation and resultant EMI. The number of preselected scrambled control symbols can be chosen from any sufficiently large set of scrambled control symbols such that their transmission characteristics are desirable when placed in proximity to other transmission mediums, whether wired or wireless.

Referring now to FIG. 5, an exemplary embodiment of a circuit 500 adapted to implement the reception of scrambled control symbols is illustrated. The circuit illustrated in FIG. 5 is shown implemented in hardware, although it is again appreciated that the logic illustrated could readily be implemented in software as well, or combinations thereof. The circuit 500 includes a receiver 502 that receives the incoming scrambled control symbols from the transmitter. These incoming scrambled control symbols are then fed into a lookup table 504. The lookup table 504 is essentially a reverse of the lookup table 406 shown in FIG. 4; the lookup table in FIG. 5 takes the scrambled control symbol and outputs an apparent random value (e.g., the 4-bit value that served as the input to the lookup table in FIG. 4).

The circuit also includes an LFSR 508 which is synchronized with the LFSR 402 illustrated in FIG. 4 so that its output is identical. Similar to that shown in FIG. 4, in an exemplary embodiment, the LFSR is a 16-bit LFSR, in which a subset of bits (e.g. the four (4) least significant bits) is used for control symbol decoding. This subset of bits is then fed into an XOR logic gate 506, and is XOR'd with the bit value determined by the lookup table 504. The output of this XOR operation is a 4-bit value with the least significant two bits being indicative of the original control signals D1 and D0.

Figure 6:
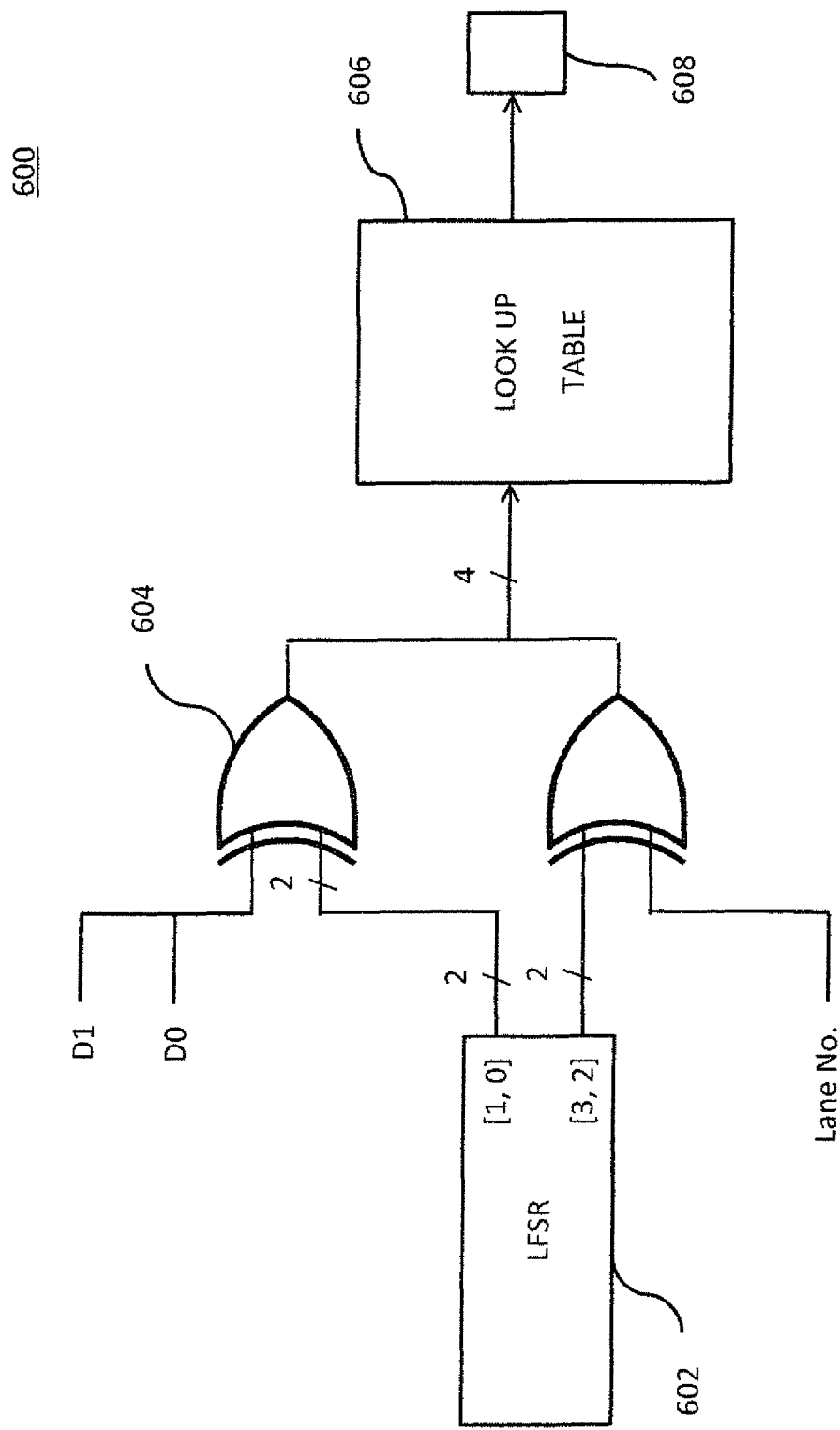
FIG. 6 is a functional block diagram illustrating another embodiment of a circuit adapted to implement the scrambling of control symbols in accordance with the disclosure.

Referring now to FIG. 6, an exemplary embodiment of a circuit 600 adapted for the transmission of scrambled control symbols is illustrated. The circuit illustrated in FIG. 4 is shown implemented in hardware, although it is appreciated that the logic illustrated in FIG. 6 could readily be implemented in software, or combinations of hardware and software, as well. The circuit 600 includes an LFSR 602 which is advantageously used because the operation of the LFSR is deterministic, while also providing a sequence of bits that appears random. In an exemplary embodiment, the LFSR is a 16-bit LFSR, that is "self-synchronizing" as described previously herein with regards to Example No. 3. When using an exemplary 16-bit LFSR, a subset of bits (e.g. the four (4) least significant bits) is used for control symbol encoding.

Of this subset of bits, an additional subset (e.g. the two (2) least significant bits of the subset) is fed into an XOR logic gate 604 along with control signals D1 and D0. The output of the XOR logic gate is then combined with the XOR'd output of the two most significant bits of this subset and the lane number to produce a 4-bit random value. This random value is then fed into a lookup table 606. The lookup table then chooses a scrambled control symbol value and forwards this scrambled control symbol value to transmitter 608.

Figure 7:
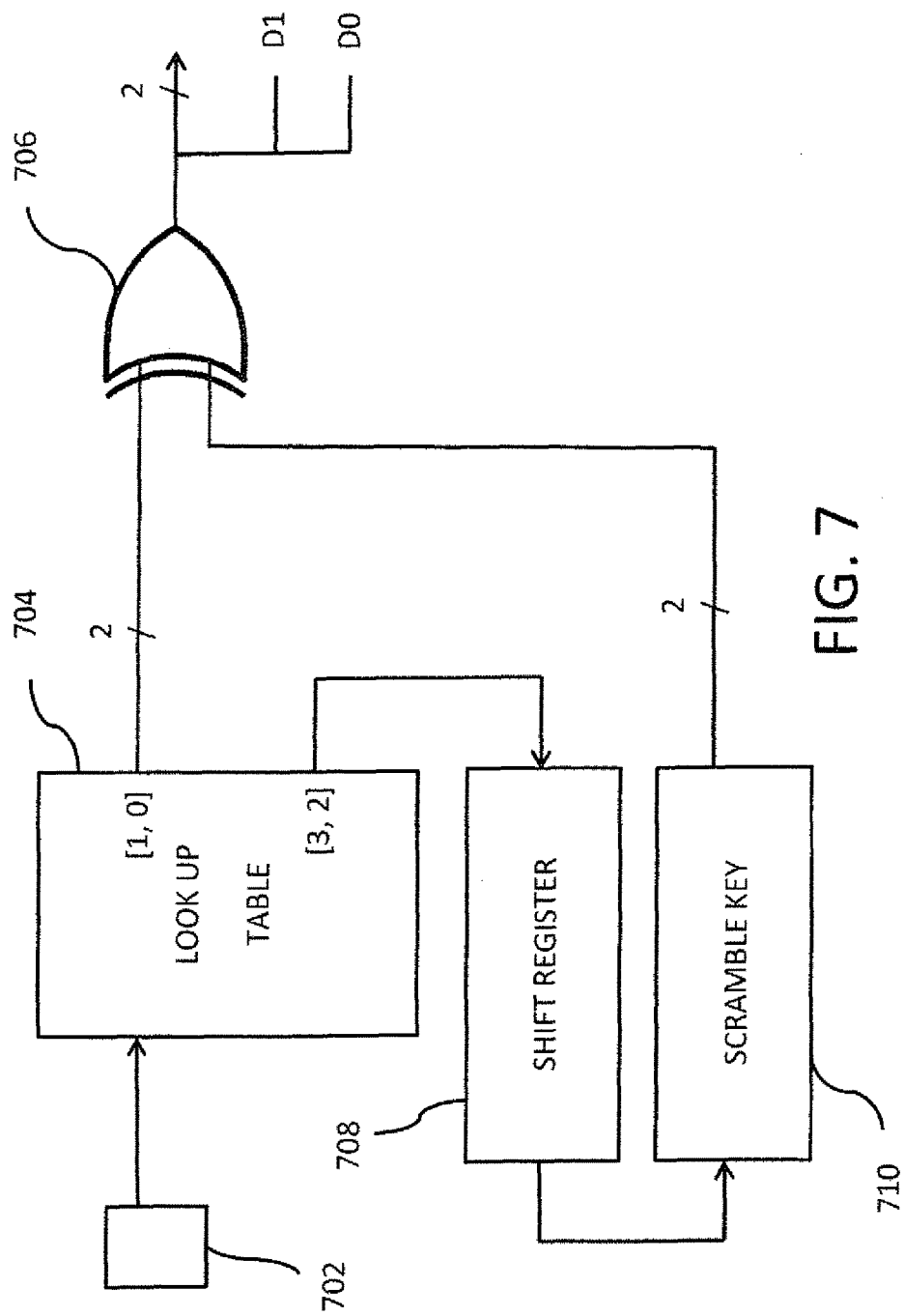
FIG. 7 is a functional block diagram illustrating another embodiment of a circuit adapted to implement the unscrambling of scrambled control symbols in accordance with the disclosure.

Referring now to FIG. 7, an exemplary embodiment of a circuit 700 adapted to implement the reception of scrambled control symbols, such as those transmitted in the transmitter of FIG. 6 is illustrated. The circuit illustrated in FIG. 7 is shown implemented in hardware, although it is again appreciated that the logic illustrated could readily be implemented in software as well, or combinations thereof. The circuit 700 includes a receiver 702 that receives the incoming scrambled control symbols from the transmitter. These incoming scrambled control symbols are then fed into a lookup table 704. The lookup table 704 is essentially a reverse of the lookup table 606 shown in FIG. 6; the lookup table in FIG. 7 takes the scrambled control symbol and outputs an apparent random value (e.g., the 4-bit value that served as the input to the lookup table in FIG. 6).

The least significant two bits of this 4-bit value are then fed into an XOR logic gate 706, along with the value of scramble key 710 in order to output the control values "D1" and "D0". In order to generate the value of scramble key 710, the most significant two bits of this 4-bit value are fed into a shift register 708. As discussed previously herein, due to the nature of the LFSR chosen in the transmitter, i.e. the generating function for the LFSR does not contain the terms X3, X2 or X1, the shift register can be used in order to generate the appropriate scramble key value for the next scrambled control symbol received at the receiver 702. In this manner, by using a self-synchronizing LFSR in the transmitter, the receiver can be implemented without having to contain its own respective LFSR, thereby greatly simplifying the receiver logic.

Figure 8:
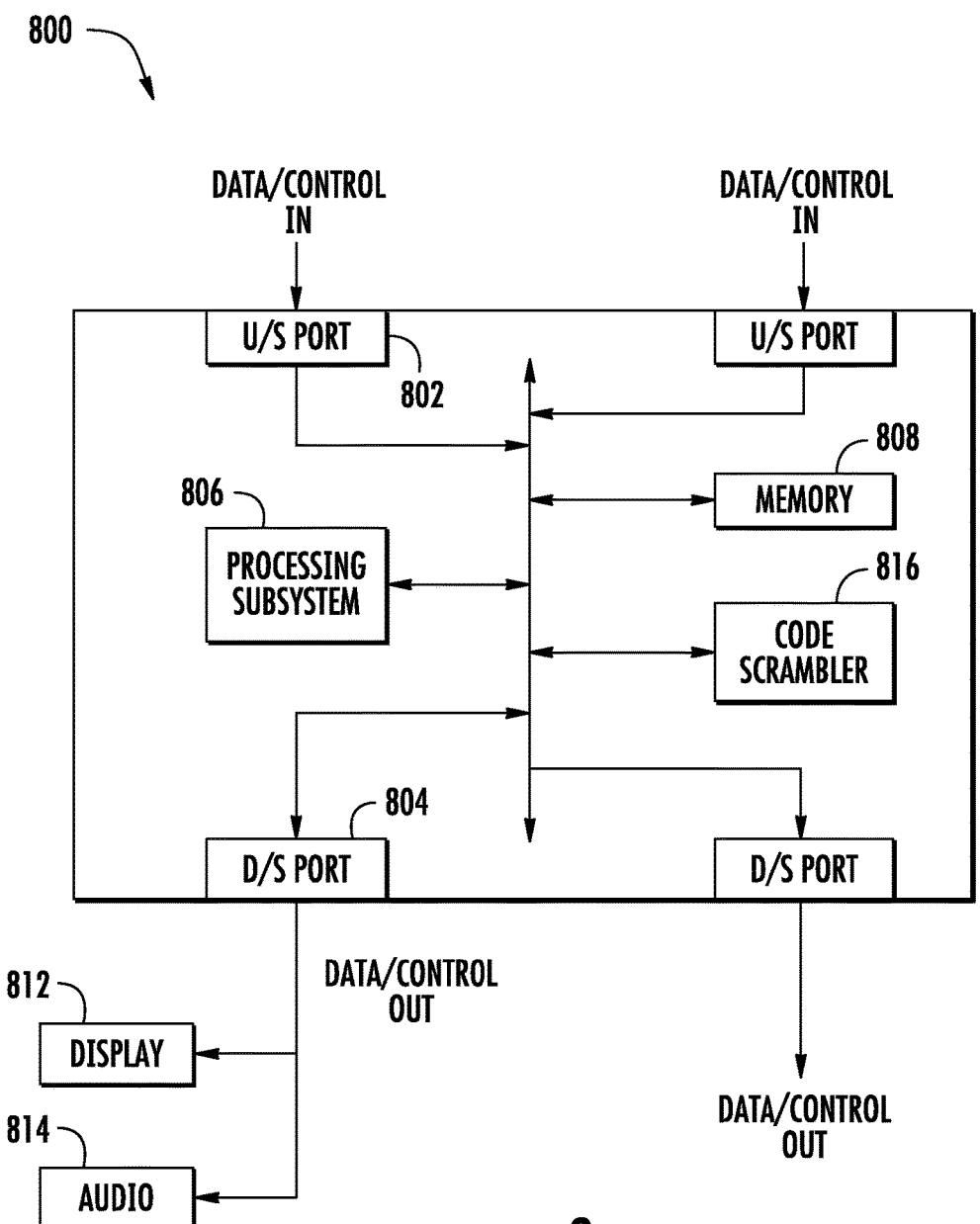
FIG. 8 is a functional block diagram illustrating one embodiment of a network component apparatus adapted to implement the methods of the present disclosure.

Referring now to FIG. 8, an exemplary user device (apparatus) 800 having control symbol encoding/decoding capability is illustrated. As used herein, the term "user device" includes but is not limited to cellular telephones, smartphones (such as for example an iPhone™ manufactured by the Assignee hereof), personal computers (PCs), such as for example an iMac™, Mac Pro™, Mac Minim™, MacBook™, MacBook Pro™, MacBook Air™, and minicomputers, whether desktop, laptop, or otherwise, as well as mobile devices such as handheld computers, PDAs, video cameras, set-top boxes, personal media devices (PMDs), such as for example an iPod™, iPad™, display devices (e.g., those compliant with the aforementioned HDMI standard(s)), or any combinations of the foregoing. While a specific device configuration and layout is shown and discussed, it is recognized that many other configurations may be readily implemented by one of ordinary skill given the present disclosure, the apparatus 800 of FIG. 8 being merely illustrative of the broader principles of the disclosure. For example, it is appreciated that the device illustrated in FIG. 8 could readily be implemented as either a source or alternatively as a sink, or in fact could be configured to operate as both. Appropriate modifications to the layout shown would be readily apparent to one of ordinary skill given the present disclosure.

The illustrated apparatus 800 of FIG. 8 includes an upstream plurality of ports and corresponding receiving elements (e.g., receiver or transceiver network interfaces) 802, a downstream plurality of ports and corresponding transmitting elements (transmitting interfaces or transceivers) 804. As used herein, the terms "network interface" or "interface" typically refer to any signal, data, or software interface with a component, network or process including for example and without limitation those of the HDMI, FireWire (e.g., FW400, FW800, etc.), USB (e.g., USB2, USB 2.0, USB 3.0, wireless USB), Ethernet (e.g., 10/100, 10/100/1000 (Gigabit Ethernet), 10-Gig-E, etc.), Thunderbolt, or wireless varieties.

The upstream plurality of ports and associated receiving elements 802 may comprise one or more upstream auxiliary channels, one or more upstream media ports, and receiver apparatus (e.g., multiplexing switches, reception logic, clock recovery circuitry, etc.). In one exemplary embodiment, the auxiliary channel is bi-directional and carries management and device control data, and the upstream media ports minimally comprise receivers for unidirectional data lanes, and use of an embedded clock. The receiver apparatus monitors and selectively enables and disables the auxiliary and media ports. In certain embodiments, the receiver apparatus may be adapted to utilize a packet-based unidirectional network protocol, such as the HDMI protocol previously described herein.

Similarly, the downstream plurality of ports and associated receiving elements 804 comprise one or more downstream auxiliary channels, one or more downstream media ports, and transmitter apparatus (e.g. demultiplexing switches, transmission logic, clock embedding circuitry, etc.). In one exemplary embodiment, the auxiliary channel is bi-directional and carries management and device control data, and the downstream media ports minimally comprise transmitters for unidirectional data lanes, and inclusion of an embedded clock. The transmitter apparatus monitors and selectively enables and disables the auxiliary and media ports. As with the receiver, the transmitter apparatus may be adapted to utilize a packet-based unidirectional network protocol (e.g., HDMI).

In an exemplary implementation, the downstream-facing ports may include a serializer adapted to receive an input word and output a bit stream. For example, in one configuration, the serializer may receive a 10-bit input word and output ten (10) serial bits. In addition, the serializer may also provide an optional corresponding clock.

Conversely, in another configuration, the upstream-facing ports may also include a de-serializer adapted to receive a serial bit stream and output a word. Furthermore, such de-serializing apparatus may additionally require clock recovery circuitry and boundary detection, as is well understood in the digital computing arts. For example, in one embodiment, the de-serializer may receive 10 (ten) serial bits, and convert it into one 10-bit word. When the de-serializer detects a misalignment of timing by one or more bits, the de-serializer accordingly skips or pads its rate accordingly. Furthermore, during initialization, the de-serializer may recognize an initiation sequence.

Also included are one or more storage devices (e.g., a memory subsystem) 810 used to store for example data for transmission or that has been received.

It will be appreciated that not all elements are required in a single device for operation within a "network", for instance a device only capable of "source" operation would not require upstream ports, or certain audio or video elements. Conversely, a "sink" device may not require downstream ports. Moreover, the "receiver" 802 and "transmitter" 804 elements may comprise transceivers capable of both transmission and reception if desired.

Note that as used herein, such network may be comprised of as few as two devices in communication with one another via an interface, or even two components in communication with one another within the same host apparatus.

The processing subsystem 806 may comprise one or more of central processing units (CPU) or digital processors, such as a microprocessor, digital signal processor, field-programmable gate array, RISC core, or plurality of processing components mounted on one or more substrates.

The processing subsystem is coupled to memory subsystem 810, which may include for example SRAM, FLASH and SDRAM components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

The processing subsystem may also comprise additional co-processors, such as a dedicated graphics accelerator, network processor (NP), or audio/video processor. As shown processing subsystem 806 includes discrete components, however it is understood that in some embodiments they may be consolidated or fashioned in a SoC (system-on-chip) configuration.

The processing subsystem 806 is adapted to receive one or more media streams from an upstream apparatus 802 for processing for media displays such as a video display 812, or audio speakers 814. Processing subsystem 806 may preferentially comprise graphics processors, applications processors, and or audio processors. In "thin clients", the processing subsystem 806 may be significantly reduced in complexity and limited to simple logic, or in extreme cases altogether non-existent.

The control code scrambling circuitry 816 is, in an exemplary embodiment, tightly coupled (i.e., directly accessible) for execution on the processing subsystem. This circuitry could be embodied in hardware, software or a combination of both. As used herein, the term "circuitry" refers to any type of device having any level of integration (including without limitation ULSI, VLSI, and LSI) and irrespective of process or base materials (including, without limitation Si, SiGe, CMOS and GaAs). ICs may include, for example, memory devices, digital processors, SoC devices, FPGAs, ASICs, ADCs, DACs, transceivers, memory controllers, and other devices, as well as any combinations thereof. It is however recognized that the control code scrambling circuitry could alternatively be decoupled and executed independent of the processing element in alternate embodiments.

In an exemplary embodiment, the control code encoding circuitry 816 of the apparatus of FIG. 8 is implemented at least in part as a computer program; e.g., module of executable application software embodied within a tangible medium such as a physical block of memory (for example, the memory subsystem 808 of FIG. 8). As used herein, the term "computer program" or "software" is meant to include any sequence or human or machine cognizable steps which perform a function. Such program may be rendered in virtually any programming language or environment including, for example and without limitation, C/C++, Fortran, COBOL, PASCAL, assembly language, and the like, as well as object-oriented environments such as Java™ (including J2ME, Java Beans, etc.).

It will be readily appreciated by those of ordinary skill that different combinations and/or variations of the foregoing can be made depending on the desired application and performance attributes.

It will be recognized that while certain aspects of the disclosure are described in terms of a specific sequence of steps of a method, these descriptions are only illustrative of the broader methods, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claims herein.

While the above detailed description has shown, described, and pointed out novel features of the disclosure as applied to various embodiments, it will be understood that various omissions, substitutions, and changes in the form and details of the device or process illustrated may be made by those skilled in the art. The foregoing description is of the best mode presently contemplated. This description is in no way meant to be limiting, but rather should be taken as illustrative of the general principles, and the scope of the various aspects of the disclosure should be determined with reference to the claims.

What is claimed is:

1. A method of transmitting data so as to reduce electromagnetic interference associated therewith, the method comprising:
receiving a plurality of un-encoded control symbols and a plurality of data symbols;
generating one or more pseudo-random values based on a transmitting linear feedback shift register (LFSR); and
scrambling only the plurality of un-encoded control symbols, the plurality of un-encoded control symbols being scrambled with the generated one or more pseudo-random values in order to produce a plurality of corresponding pseudo-random values, where a plurality of scrambled corresponding control symbols are retrieved from a lookup table based on the plurality of corresponding pseudo-random values generated using the scrambling;
wherein:
transmission of the plurality of scrambled corresponding control symbols minimizes undesirable electromagnetic radiation and interference;
the receiving LFSR comprises a self-synchronizing LFSR; and
the receiving LFSR is forced to a known value to self-synchronize, the known value comprising a channel number selected from a plurality of channel numbers.

2. The method of transmitting data of claim 1, wherein the plurality of un-encoded control symbols is associated with a High-Definition Multimedia Interface (HDMI) interface.

3. The method of claim 1, further comprising using a sub-set of bits generated by the transmitting LFSR, the sub-set of bits being used to generate the one or more pseudo-random values.

4. The method of claim 3, wherein the using of the sub-set of bits comprises using a set of least significant bits to generate the plurality of pseudo-random values.

5. The method of claim 3, wherein the using of the sub-set of bits comprises using a set of most significant bits to generate the plurality of pseudo-random values.

6. The method of claim 1, wherein the transmitting of the plurality of scrambled corresponding control symbols further comprises transmitting the plurality of scrambled corresponding control symbols when the transmitting LFSR and the receiving LFSR are synchronized.

7. The method of claim 1, further comprising updating a running disparity count after each one of the plurality of scrambled corresponding control symbols is transmitted.

8. The method of claim 7, further comprising using the running disparity count for the retrieving of the plurality of scrambled corresponding control symbols.

9. The method of claim 1, further comprising padding the generated one or more pseudo-random values with one or more additional bits.

10. The method of claim 9, further comprising generating an index value for use with the lookup table by exclusive OR'ing the padded one or more pseudo-random values with the generated one or more pseudo-random values.

11. An apparatus, the apparatus comprising:
a transmitting linear feedback shift register (LFSR); and
an electronic circuit configured to:
receive a plurality of un-encoded control symbols and a plurality of data symbols;
generate one or more pseudo-random values based on the transmitting LFSR; and
scramble only the plurality of un-encoded control symbols, the plurality of un-encoded control symbols being scrambled with the generated one or more pseudo-random values in order to produce a plurality of corresponding pseudo-random values, where a plurality of scrambled corresponding control symbols are retrieved from a lookup table based on the plurality of corresponding pseudo-random values generated using the scrambling;
wherein:
transmission of the plurality of scrambled corresponding control symbols minimizes undesirable electromagnetic radiation and interference;
the receiving LFSR comprises a self-synchronizing LFSR; and
the receiving LFSR is forced to a known value to self-synchronize, the known value comprising a channel number selected from a plurality of channel numbers.

12. The apparatus of claim 11, wherein the plurality of un-encoded control symbols are associated with a High-Definition Multimedia Interface (HDMI) interface.

13. The apparatus of claim 12, wherein the electronic circuit is further configured to use a sub-set of bits generated by the transmitting LFSR, the sub-set of bits being used to generate the one or more pseudo-random values.

14. The apparatus of claim 13, wherein the use of the sub-set of bits further comprises use of a set of least significant bits to generate the plurality of pseudo-random values.

15. The apparatus of claim 13, wherein the use of the sub-set of bits further comprises use of a set of most significant bits to generate the plurality of pseudo-random values.

16. The apparatus of claim 11, wherein the transmission of the plurality of scrambled corresponding control symbols further comprises transmission of the plurality of scrambled corresponding control symbols when the transmitting LFSR and the receiving LFSR are synchronized.

17. The apparatus of claim 11, wherein the electronic circuit is further configured to update a running disparity count after each one of the plurality of scrambled corresponding control symbols is transmitted.

18. The apparatus of claim 17, wherein the running disparity count is utilized for the retrieval of the plurality of scrambled corresponding control symbols.

19. The apparatus of claim 11, wherein the electronic circuit is further configured to pad the generated one or more pseudo-random values with one or more additional bits.

20. The apparatus of claim 19, wherein the electronic circuit is further configured to generate an index value for use with the lookup table via an exclusive OR operation of the padded one or more pseudo-random values with the generated one or more pseudo-random values.

* * * * *